United States Patent
Tran et al.

(10) Patent No.: US 10,330,378 B2
(45) Date of Patent: *Jun. 25, 2019

(54) FREEZER WITH REMOTE MANAGEMENT

(71) Applicants: Bao Tran, Saratoga, CA (US); William Moon, Provo, UT (US)

(72) Inventors: Bao Tran, Saratoga, CA (US); William Moon, Provo, UT (US)

(73) Assignee: Reflect Scientific Inc., Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/708,127

(22) Filed: Sep. 19, 2017

(65) Prior Publication Data

US 2019/0086145 A1 Mar. 21, 2019

(51) Int. Cl.
*F25D 29/00* (2006.01)
*F25B 19/00* (2006.01)

(52) U.S. Cl.
CPC .......... *F25D 29/001* (2013.01); *F25B 19/005* (2013.01); *F25D 2400/30* (2013.01); *F25D 2700/122* (2013.01)

(58) Field of Classification Search
CPC ............... F25D 29/001; F25D 2400/30; F25D 2700/122; F25B 19/005
USPC ........................................................ 702/178
See application file for complete search history.

(56) References Cited

U.S. PATENT DOCUMENTS

| | | | | |
|---|---|---|---|---|
| 4,033,161 | A * | 7/1977 | Goes | E05B 51/02 70/275 |
| 5,598,713 | A * | 2/1997 | Bartilucci | F25D 3/105 62/384 |
| 5,660,046 | A * | 8/1997 | de Langavant | F25D 3/105 62/239 |
| 6,694,204 | B1 | 2/2004 | Bair, III | |
| 8,191,380 | B2 * | 6/2012 | Aragon | F25D 3/125 62/384 |
| 10,188,098 | B2 * | 1/2019 | Moon | A01N 1/0257 |
| 2002/0129613 | A1 * | 9/2002 | Viegas | B60H 1/00014 62/239 |
| 2008/0155993 | A1 * | 7/2008 | Kuehl | F25B 25/00 62/3.6 |
| 2009/0113899 | A1 * | 5/2009 | Dain | F25D 11/04 62/48.1 |
| 2010/0071384 | A1 * | 3/2010 | Lu | B60H 1/00592 62/3.2 |
| 2011/0224947 | A1 * | 9/2011 | Kriss | F24F 3/1603 702/179 |

(Continued)

*Primary Examiner* — Kun Kai Ma
(74) *Attorney, Agent, or Firm* — Tran & Associates

(57) ABSTRACT

A freezer includes a plurality of evaporators coupled to a payload bay with a multiplicity of coolant tubes in each evaporator, wherein each tube enters and then exits the payload bay, further comprising one or more cryogenic valves coupled to the coolant tubes; a pump to force coolant flowing through the evaporators; sensors coupled to the evaporators of the freezer to monitor vital parameters of the freezer; a processor; a wireless telemetry system to communicate one or more measured characteristics of the freezer in accordance with a service level agreement to a remote computer; and at least one notification component that provides a notification associated with a specific customer responsive to the measured characteristic of the service crossing a pre-defined threshold.

18 Claims, 9 Drawing Sheets

(56) References Cited

U.S. PATENT DOCUMENTS

| | | | |
|---|---|---|---|
| 2011/0225984 A1* | 9/2011 | Brooks | F25D 3/105 |
| | | | 62/48.1 |
| 2012/0291456 A1* | 11/2012 | Rampersad | F25D 3/11 |
| | | | 62/63 |
| 2015/0121926 A1* | 5/2015 | Lee | F25B 5/02 |
| | | | 62/157 |
| 2015/0144296 A1* | 5/2015 | Macron | B60P 3/20 |
| | | | 165/11.1 |
| 2015/0150088 A1* | 5/2015 | Haga | H04L 12/28 |
| | | | 726/3 |
| 2016/0290635 A1* | 10/2016 | Frenette | F23D 14/24 |
| 2017/0234583 A1* | 8/2017 | Moon | F25D 3/105 |
| | | | 62/50.2 |
| 2017/0234597 A1* | 8/2017 | Moon | F25D 3/11 |
| | | | 62/50.2 |
| 2017/0257389 A1* | 9/2017 | Cocchiara | G06N 7/005 |
| 2017/0292759 A1* | 10/2017 | Al-Hallaj | F25D 11/006 |
| 2018/0073806 A1* | 3/2018 | Dern | F25B 13/00 |

\* cited by examiner

FREEZER WITH REMOTE MANAGEMENT

FIELD OF INVENTION

The present invention relates to high speed cooling freezers and methods for maintenance.

BACKGROUND OF THE INVENTION

Many applications require the specific capability of freezing a product in an extremely short time. Exemplary users include companies that require plasma or blood related products to be frozen quickly and completely to −40 C. Such companies contain their product in a multiplicity of specially formulated plastic bags that contain between 250 cc and 500 cc of plasma or blood related products. These companies may freeze up to 100 bags simultaneously, placing approximately 10 bags on a tray and up to 10 trays in the freezer. Traditionally, cooling devices known in the industry as Blast Freezers are used with the unique capability of freezing the customer's products at a substantially faster rate than standard laboratory or storage freezers. Typically, state of the art Blast Freezers are mechanical, with compressors and refrigerants. The main drawback is that the boiling point of the refrigerant is approximately −100 C which severely limits the ability to freeze product quickly. As an example, these freezers are unable to freeze a batch of 100 bags to −40 C in less than 2 hours.

SUMMARY

In one aspect, a freezer includes optional shelves in an insulated payload bay; a plurality of evaporators coupled to the payload bay with a multiplicity of coolant tubes in each evaporator, wherein each tube enters and then exits the payload bay, further comprising one or more cryogenic valves coupled to the coolant tubes; a pump to force coolant flowing through the evaporators; sensors coupled to the evaporators of the freezer to monitor vital parameters of the freezer; a processor; a wireless telemetry system to communicate one or more measured characteristics of the freezer in accordance with a service level agreement (SLA) to a remote computer; and at least one notification component that provides a notification associated with a specific customer responsive to the measured characteristic of the service crossing a pre-defined threshold.

Implementations of the above aspect may include one or more of the following. The service is a temperature service. A maintenance prediction component can be used to predict when maintenance is needed. At least one notification component sends a message addressed to the specific customer to notify the specific customer about the measured characteristic crossing the pre-defined threshold. At least one notification component sends a notification message addressed to a service to notify the service provider about the measured characteristic crossing the pre-defined threshold. At least one of a trouble ticket and a billing credit associated with the specific customer is generated in response to the notification message. At least one notification device sends a message addressed to a monitoring entity that is independent of a service provider providing the service. The characteristic measured includes temperature and humidity level, and the pre-defined threshold is a minimum LNO level necessary for delivery of the temperature service. The processor determines ULT performance based on a comparison of the performance of the each of the plurality of ULT assets in comparison to performance of a reference population of UTL devices. The device is part of a plurality of ULT assets, and wherein measurements are captured at the plurality of ULT assets by a plurality of sensors configured to communicate the measurements through a routable communications network. At least one of the plurality of sensors is configured to communicate statistical information based on measurements of performance or energy consumption of a refrigeration system associated with the at least one sensor. At least one of the plurality of smart sensors is configured to communicate analytical information based on a statistical analysis of measurements of performance of the ULT device associated with the at least one sensor.

In yet other implementations, the material can be an insulation material with an open cell foam that has the structural strength to maintain the dimensional integrity of the freezer, and the physical property of allowing the air and water vapor to vacate foam. The vacuum region can be processed by removing residual water vapor and other partial pressure of contaminants. The vacuum region is evacuated to a partial pressure of approximately 0.2 milli-Torr. Another method for obtaining cryogenic vacuum thermal properties, without the effort of making a sealed thermal box and pulling a vacuum, is through the use of Vacuum Insulated Panels (VIP). The VIPs are panels, approximately 2 inches thick, with the thermal properties of a vacuum. The VIPs are delivered from the supplier with a vacuum, and are placed in the walls of the thermal box. As a second operation, Polyurethane foam is injected to fill all of the voids in the thermal box. This process provides nearly the equivalent thermal insulation as the vacuum pumping method described above, with less effort and cost.

The cryogenic heat exchanger can include one or more tubings and may include redundant tubings. The cryogenic heat exchanger can be U-shaped tubings covering at least three walls of the payload bay. The cryogenic heat exchanger can include tubings covering at least four sides of the payload bay. Alternatively, the cryogenic heat exchanger can be one or more coils positioned on the top and/or the bottom of the vessel. A port can connect to the one or more tubings to provide input and output connections thereto. A door can allow access to the payload bay, wherein the door comprises three or more materials having different thermal characteristics.

In another aspect, method to provide ultra low temperature processing and/or storage includes providing insulation and structural support using a material disposed in a vacuum region between an external housing and an inner housing; cryogenically processing one or more compartments contained in a payload bay; measuring a characteristic of service being provided to the specific customer; and generating a notification associated with a specific customer responsive to the measured characteristic of the service crossing a pre-defined threshold.

In a further aspect, a method to provide ultra low temperature processing and/or storage includes providing insulation and structural support using a material disposed in a vacuum region between an external housing and an inner housing; and cryogenically processing one or more compartments contained in the payload bay.

Implementations of the above aspect may include one or more of the following. The material can be an insulation material with silica micro balloon technology. The process can remove water vapor, partial pressure contaminates and atmospheric gases from the vacuum region. The process includes evacuating the vacuum region to approximately 0.2 millitorr. The cryogenic heat exchanger can have one or more heat exchange tubings, and can include redundant tubings. The redundant tubings can be a complete set of heat exchange tubings operating in parallel with the primary heat exchange tubings. The redundant tubings can have one or more tubings branched from the primary heat exchange tubings. The cryogenic heat exchanger can also include U-shaped tubings covering at least three walls of the inner housing. The tubings can cover at least four sides of the inner housing. A door can be formed with a plurality of materials each having different thermal characteristics. A changeable rack assembly is supported in the chamber. The system can transmit energy from the payload bay into the heat exchanger through the changeable rack assembly. A negative pressure in the payload bay can be maintained through the use of pneumatic seals on the main door assembly. The cryogenics vacuum pumping via the heat exchanger can provide energy removal from the payload bay and into the heat exchanger. The surfaces of at least one of the external and inner housing can be flat surfaces.

In another aspect of the blast freezer, the customer has the capability of not only freezing product quickly, but also putting the freezer into a very efficient mode that will maintain a cold temperature setpoint for long term storage. In this mode, the internal fans are turned off and an additional control valve, in parallel with the main valve, replaces the function of the normally fast flowing main control valve. This valve operates with a flow that is only a small percentage of the main valve, when fast freezing is not required, and operates much more efficiently for maintaining a setpoint over a long period of time.

In an implementation, the freezer has the capability of heating the contents of the payload bay to a temperature as high as 100 deg C. This heating process may take place immediately after freezing or later. Additionally, product may be placed into the ULT for the sole purpose of heating. The heating capability is accomplished in one of four ways. These methods are easily attainable, because the thermodynamic properties used for cooling also apply to heating. For example, in cooling, the fans accelerate the cooling rate, by greatly increasing the convective heat transfer from the customer's product to the fast moving cold air. In heating, these same fans equally function in a heating capacity, convectively transferring the heat from the fast moving warm air to the colder product. This is the same process used in convection ovens. The convective heat transfer (hc) increases due to airflow, thus increasing the heat transfer (Q=(hc)*A*(deltaT)).

The first method for heating the contents of the payload bay takes advantage of the properties of a fan. The fan moves air, but in doing so, it also causes a small rise in temperature. As the air passes through the fan blades, the blades increase the pressure of the air, which then causes the air to move. This increased pressure raises the air temperature slightly (PV=nrT). Also, the heat produced by the fan motor electrical current, commonly referred to as "I squared R losses", goes into the air. Since the payload bay is sealed, the heat gain from both of these properties of the fan, although small, is contained within the bay and additively increases the temperature, given enough time, to as much as 100 deg C. All four methods of product heating described herein benefit from these natural heating properties of electrical fans.

The second method uses a plurality of 120 VAC heating pads, located in the airflow path of the blast freezer fans. All of the energy going into the heated pads is transferred to the air inside the freezer, because the freezer is a closed system, isolated by the thermal box. The blast freezer fans transfer this heated air to the product.

The third method uses an air compressor, a small holding tank and a three-way electronically controlled valve. The compressor pressurizes room air and transfers it to the tank, maintaining the tank to a pressure of approximately 100 psi. When the ULT calls for heat the controller sends a signal to the three-way valve. This signal stops the Nitrogen flow and opens the compressed air flow. The warm compressed air then flows through the evaporators, and the fans transfer heat to the product. There is an additional heat gain that is naturally created when the air is compressed. The increase in air pressure causes an increase in the air temperature (Pv=nrT). As a result, the air temperature in the tank will be higher than the +20 deg C. ambient temperature of the intake air of the compressor, by as much as +10 deg C. Since the air flowing through the evaporators is now approximately +30 deg C. and the product in the payload bay may be as cold as −80 deg C., this temperature difference of up to +110 deg C. is significant and causes the product to heat quickly. The heating process is controlled in a similar manner as cooling, by turning the compressed air flow on and off with the same control valve that is used for cooling.

The fourth method uses the hardware described in the third method, with the addition of a heat chamber surrounding the holding tank. The heat chamber is heated by means of energy from, but not limited to, the following: natural gas, liquefied petroleum gas, electrical heaters, kerosene, propane, or butane. The advantage of this method is the capability of heating product very rapidly.

The preferred embodiment has yet another feature that is not related to heating product in the freezer. The Nitrogen exhaust air is heated immediately after it exits the freezer. This has three advantages. First, it prevents icing of the pipes that vent to the outside of the building and into the atmosphere. Second, it provides a warmer environment for the control valves, increasing their reliability and extending their life. And third, it cools the air surrounding the freezer, effectively providing room air conditioning. The Nitrogen exhaust gas is heated by means of a heat exchanger. The heat exchanger is an integral part of the Nitrogen line located on the top of the freezer, and attached between the Nitrogen gas that exits the freezer and the control valves. The Nitrogen that has cooled the freezer is colder than the current temperature of the freezer. For example, if the freezer is at −95 deg C., the Nitrogen exhaust gas temperature is about 5 deg C. colder or −100 deg C. Fans force ambient air, which is about 20 deg C. or 120 deg C. warmer than the Nitrogen gas, through the heat exchanger. Also, as the Nitrogen gas is warmed, the air is cooled. This cool air then travels into the room, thereby providing the added feature of room air conditioning. This is an improvement over mechanical freezers that heat the ambient air, requiring customer expenses of buying, operating, and maintaining large air conditioning systems to keep the room temperature at a reasonable level.

As a means of preventing customer concern, and still maintaining safety, a pressure relief valve (PRV) is inserted in the Nitrogen line that bypasses the control valve. When conditions cause the pressure to exceed 150 psi, the PRV opens and reduces the pressure to normal operating conditions. However, if the PRV vents to the open air, which is the normal implementation, it will make a loud hissing sound. To prevent this, the PRV vents through the pipes that travel to the outside of the building. It is much quieter, and does not alarm anyone near the freezer.

Certain aspects of the present may be described in relation to a variety of types of refrigeration assets, including refrigeration farms comprising large numbers of refrigeration assets. Systems and methods are described that may be used to monitor and analyze performance of refrigeration assets, and can identify and select refrigeration assets in need of repair. In certain embodiments, a repair process may be specified, scored, classified, managed and optimized. The immediate effectiveness and long-term persistence of repairs and energy savings may be determined over time. The refrigeration assets may be analyzed, evaluated and classified according to type, design, in situ environment and/or configuration, reliability, energy efficiency, access activity, performance, make, model, manufacturer, performance or the identity of the service technician performing the repair, and other logical views.

The effectiveness of repairs and energy savings may be classified based on the measured results following repairs made by service providers, including organizations, companies and/or individuals providing repair and other services.

Certain systems and methods are provided that can determine the status and/or state-of-health of a refrigeration asset, determine the effectiveness and persistence of repairs and energy savings, identify poorly performing refrigeration assets and manage and control repair processes. Systems and methods are provided to monitor refrigeration assets using wired or wireless sensors, which transmit data to an application server for analysis and benchmarking of performance. Data may be processed and measured against time or in reference to predefined benchmarks and/or norms in order to determine relative performance in reference to selected peers as defined by query criteria, normalization, or filters. The analysis and results may be represented with a visual indication, mathematical or pattern recognition function, such as a sine wave or a statistical model. The application server may be accessed through any web browser or web interface, and the user can have a distinct login identification and password.

The preferred embodiments of the ULT refrigeration system provide long term processing of biological material at ultra-low temperature, e.g. down to −90 deg. C., with an ultimate target of −150 deg. C. The embodiment provides temperature accuracy independent of ambient conditions of temperature and humidity while maintaining uniformity of temperature throughout the chamber. The embodiment has an optimal chamber size and shape and requires minimal floor space. Low operating costs are achieved through the cryogenic refrigeration method and insulation efficiency. In various embodiments, the insulation provides additional reliability in event of failure of internal tube or external refrigeration source. Components of the system can be easily accessed for maintenance purposes with minimal side effects. The design allows for ease of manufacturability and assembly. The preferred embodiments of the system can be flexibly manufactured to different sizes and requirements at a low cost.

In a further aspect, a freezer includes a plurality of shelves in an insulated payload bay; a plurality of evaporators coupled to the payload bay with a multiplicity of coolant tubes in each evaporator, wherein each tube enters and then exits the payload bay, further comprising one or more cryogenic valves coupled to the coolant tubes; a pump to force coolant flowing through the evaporators with a pressure of at least 90 psi to supply the coolant at each evaporator with at least 20 gallons per hour of coolant; and a plurality of fans to circulate cooled air in the payload bay.

In another aspect, a freezer includes:
a liquid Nitrogen inlet capable of convenient attachment to a customer's liquid Nitrogen supply;
a cryogenic flow system that operates at a predetermined Nitrogen flow;
a payload bay with removable shelves;
a plurality of evaporators inside the payload bay;
a plurality of fans that distribute the cooled air from the evaporators to the payload bay;
a fan and evaporator support structure with a multiplicity of holes that selectively direct the cooled airflow to provide even cooling throughout the payload bay;
a thermal box immediately outside the evaporators and payload bay, that effectively thermally seals the payload bay from the outside environment, significantly reducing heat gain and attainable by pulling a vacuum or using commercially available Vacuum Insulated Panels and injected Polyurethane foam.

Implementations of the above aspect may include one or more of the following:
an electronic controller that maintains a setpoint for the payload bay, determined by the operator between approximately 20 degree C. and −150 degree C.;
two control valves, one high flow valve to accelerate freezing, and one low flow valve to optimize long term storage at a fixed setpoint;
a pneumatic latch that secures the freezer;
a pneumatic rubber seal that provides an airtight seal for the payload bay;
electronics and mechanics that controls payload bay temperatures consistently within +/−3 degree C. of the setpoint throughout the shipment duration,
an electric heating element in the airflow path
an air compressor and tank with additional heating means, used for heating the payload bay,
a heat exchanger wherein the exhaust gas flows, prior to exiting the building; and
fans attached to the heat exchanger described in item 15 for increased heat transfer.

In another aspect, a freezer system is designed for freezing a customer's product at an extremely fast rate compared to prior art products, to temperatures as low as −150 C. The freezer is comprised of a large payload bay, an inlet for the customer's supply of a cryogenic liquid such as Nitrogen, evaporators inside the payload bay, and a plurality of fans adjacent to the evaporators, that deliver extremely cold air to all surfaces of the customer's product for fast convective cooling. Further, the temperature is controlled at the exhaust port of the freezer with a cryogenic solenoid valve.

Advantages of these aspects may include one or more of the following. The preferred embodiment has the capability of reducing the freeze time of about 100 bags to about 1 hour, which is one-half the time of conventional freezers. Further, the payload bay has 20 shelves and is capable of freezing 200 bags in one batch. These almost unheard of freezing times are accomplished by design: 1) The coolant is Liquid Nitrogen, having a boiling point of −196 C, almost 100 C colder than the refrigerants used in mechanical freezers; 2) The supply pressure of the Liquid Nitrogen coolant is approximately 100 psi, which is much higher than conventional Nitrogen freezers, thus significantly increasing the coolant flow; and 3) The convective cooling properties of the freezer are greatly enhanced through the addition of a plurality of fans inside the payload bay. Further, the invention has the capability of warming the contents of the freezer, in a short amount of time, to as high as 100 deg C.

Other advantages of the preferred embodiment may include one or more of the following. The preferred embodiment provides a ULT chamber which is made in compact rectangular form, as opposed to circular or cylindrical form. The preferred embodiment also provides a substantially flat vertical door serving as the front panel of the chamber. The system may be used to monitor, manage, control and report on the operation of equipment that may be deployed locally or remotely and/or in large numbers. To facilitate description of certain aspects, specific details related to refrigeration and/or freezer assets will be given, and it will be understood that the aspects may be practiced without these specific details. In one example, methods, apparatus, and computer program products are described in relation to refrigeration systems and refrigeration assets, including ULT refrigerators and freezers, refrigeration plants and cold-storage facilities comprising large numbers of refrigeration assets. The performance of refrigeration systems and/or refrigeration assets may be monitored based on temperature and electrical current and other measurements known, inferred, deemed, and/or correlated with refrigeration performance. Performance may measure and/or characterize the status, heath, reliability and/or energy usage of a refrigeration asset or refrigeration system. Refrigeration assets in need of repair may be identified and a repair process may be specified, classified, managed locally or remotely, and optimized. The immediate effectiveness and long-term persistence of repairs and energy savings may be determined over time. The refrigeration assets may be classified, scored, and/or rated according to normalized data, design, reliability, performance, make, model and manufacturer. The effectiveness of repairs may be classified based on measured performance results following repairs. The equipment or service providers, including organizations, companies or individuals providing repair and other services, may be evaluated for the effectiveness and persistence of repair results using benchmarks and other qualitative or quantitative evaluation methods.

DESCRIPTION

A detailed description of the preferred embodiment is provided herein. It is to be understood, however, that the present invention may be embodied in various forms. Therefore, specific details disclosed herein are not to be interpreted as limiting, but rather as a basis for the claims and as a representative basis for teaching one skilled in the art how to employ the present invention in virtually any appropriately detailed system.

Figure 1:
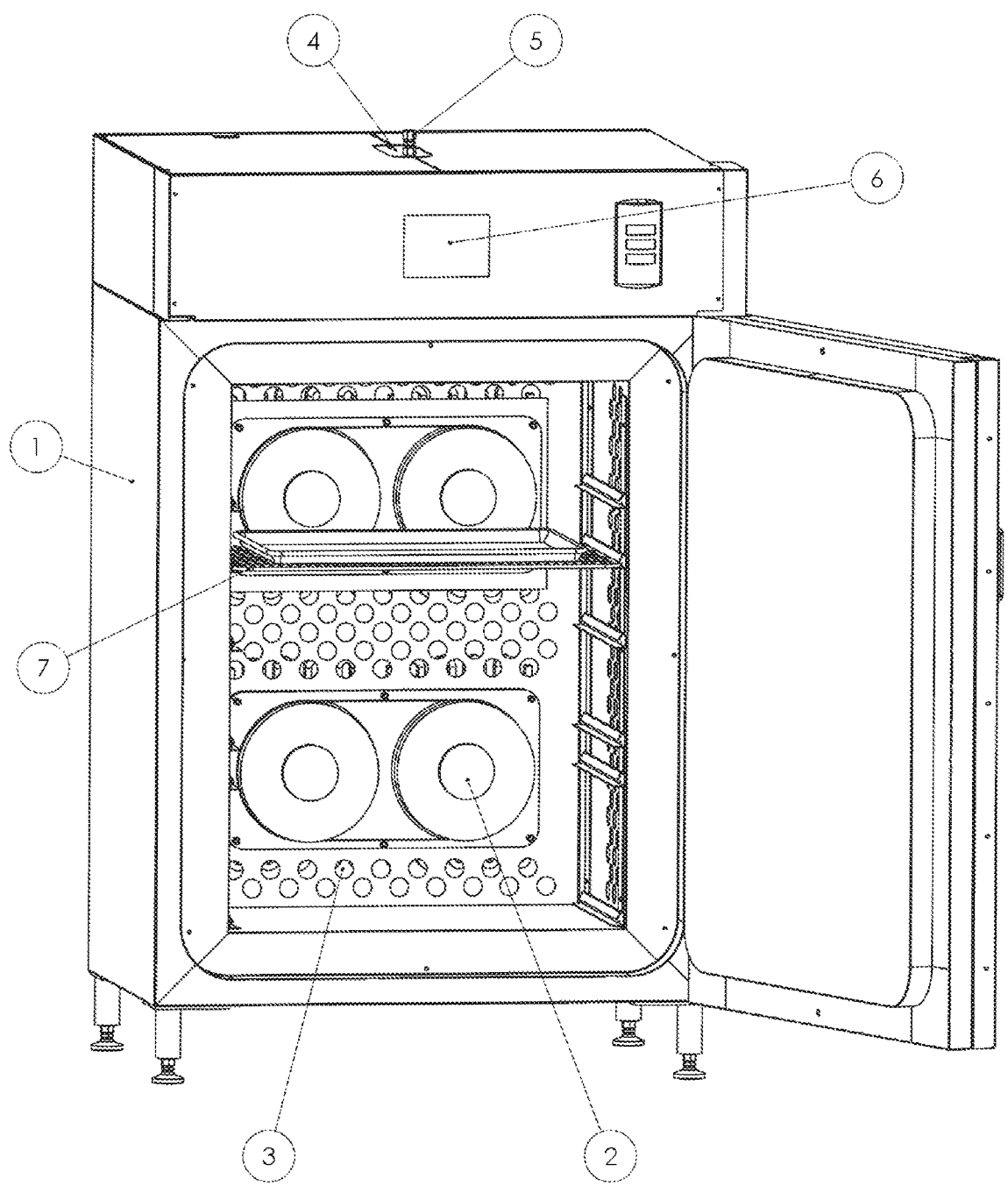
FIG. 1 is an exemplary 3D perspective view of the front of a Blast Freezer.
Figure 2:
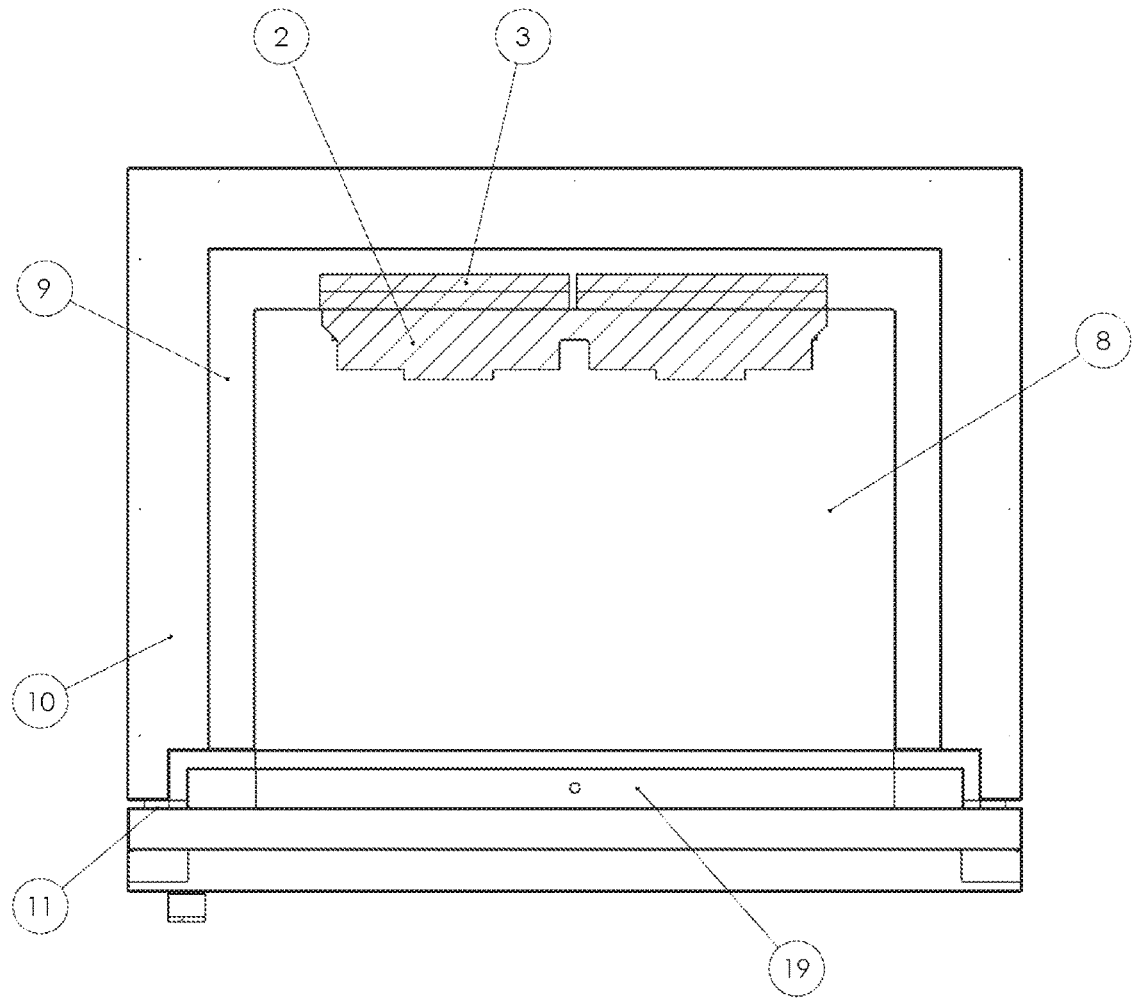
FIG. 2 is an exemplary top view of the Blast Freezer.
Figure 3:
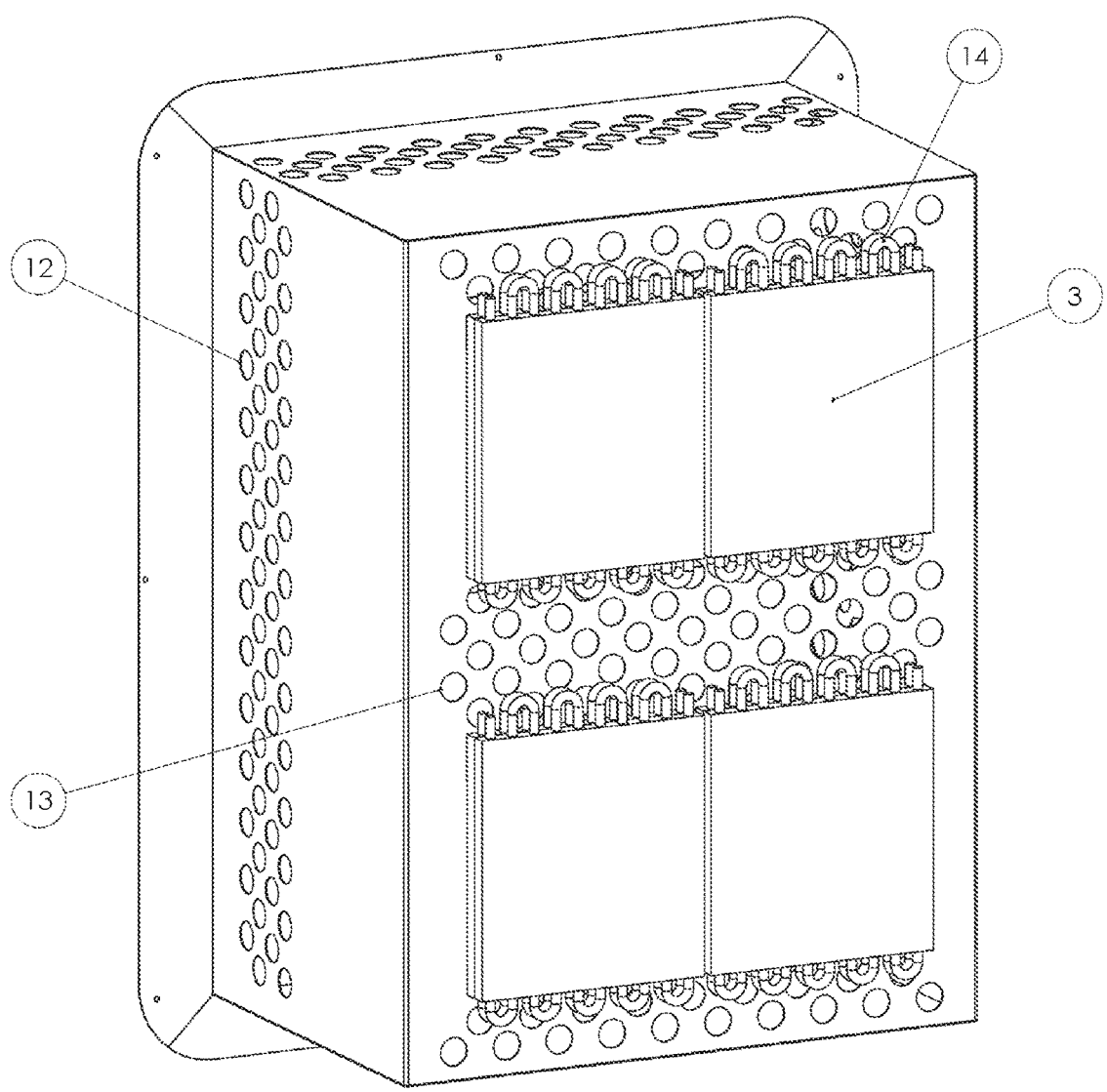
FIG. 3 is an exemplary 3D view of the back inside of the Blast Freezer.
Figure 4:
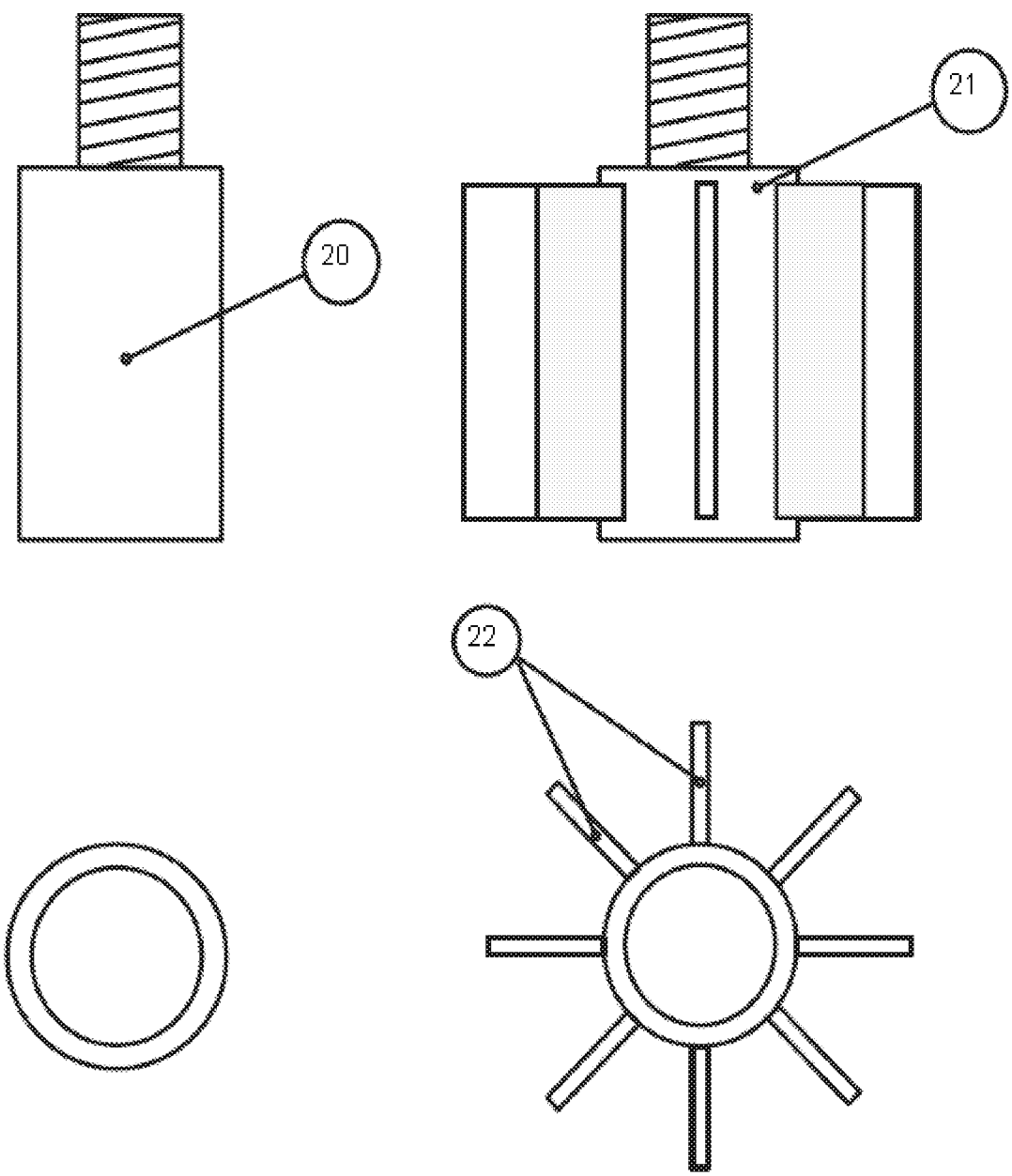
FIG. 4 is an exemplary drawing of the safety valve heating fins.
Figure 5:
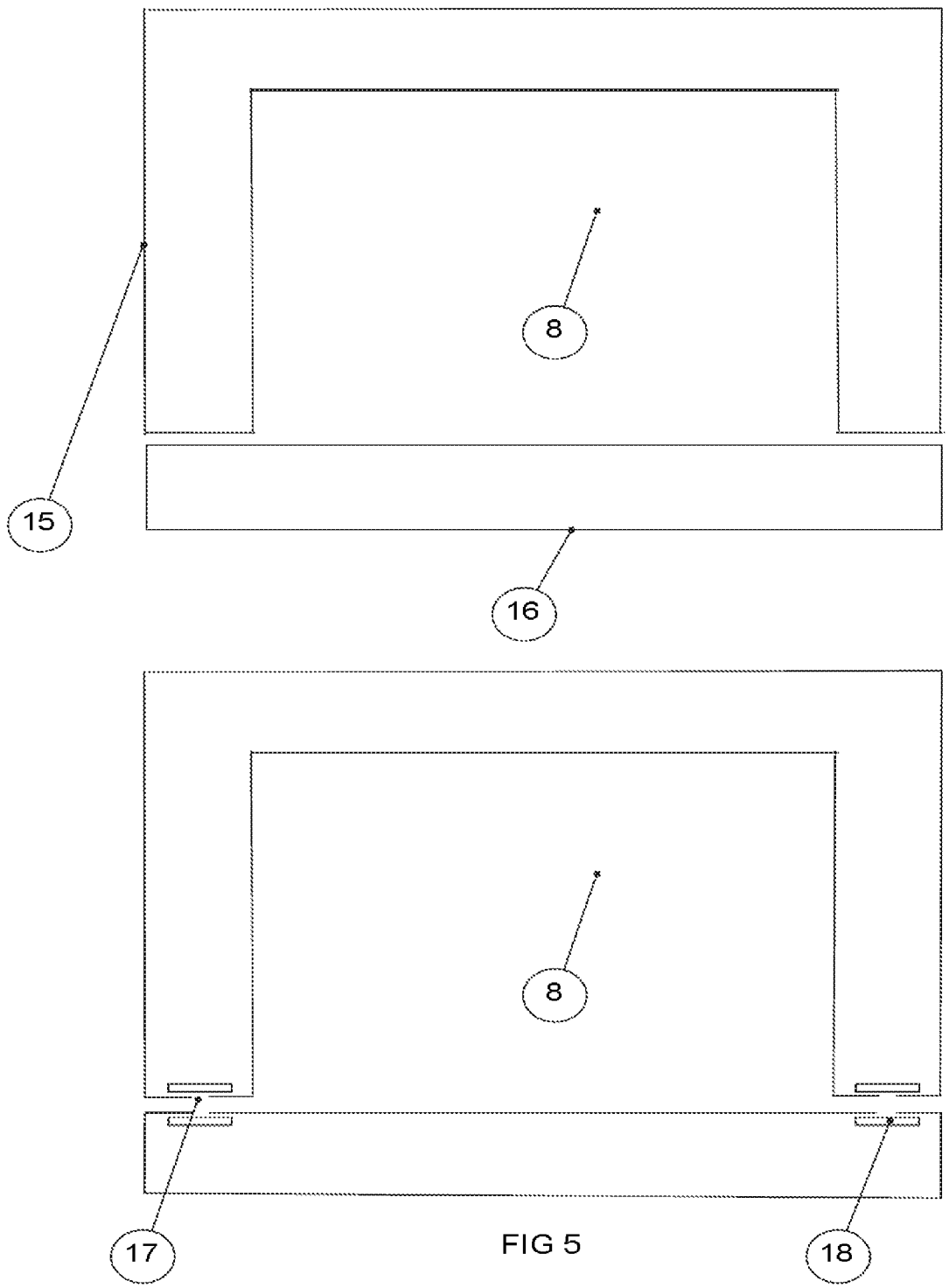
FIG. 5 is an exemplary cross section top view of the thermal barrier.

Now referring to FIGS. 1 through 3, the preferred embodiment is a freezer system 1 with a plurality of shelves 7, connected to a coolant such as a liquid Nitrogen source, and set to a pressure of 100 psi, for example. In contrast, conventional liquid Nitrogen freezers are typically set to 35 psi. The preferred embodiment, with 3 times the pressure, will supply coolant at up to 9 times the flow of conventional freezers. The 100 psi pressure will cause flows as high as 30 gallons per hour of liquid Nitrogen, thus providing extremely fast cooling. In one embodiment, a pump is used to force coolant flowing through the evaporators with a pressure of at least 90 psi to supply the coolant at each evaporator with at least 20 gallons per hour of coolant. The Nitrogen source is attached to the freezer 1 with a standard CGA 295 fitting 4. The coolant flows to a plurality of evaporators 3 that have a multiplicity of copper tubes 14 in each evaporator, thus maximizing the transfer of heat from the Liquid Nitrogen to the payload bay 8. The copper tube then exits the payload bay, where the cryogenic fluid is controlled with a cryogenic solenoid valve 5. The exhaust line is then attached to a customer portal that provides a pathway for the Nitrogen gas to flow outside the building.

As a means of significantly improving the freezing rate, multiple fans 2 with typical airflows of 1,000 CFM rapidly distribute air around the customer's containers, thus increasing the cooling convection properties of the freezer. Also, vent holes 12 and 13 are strategically placed as a means of ensuring uniform temperature throughout the payload bay.

A separate compartment 10, located between the payload bay and the outside environment, of between 2 and 4 inches thick contains a plurality of insulation materials that substantially reduces the heat gain of the payload bay from the environment. Insulation materials include, but are not limited to, high strength open cell panels and a vacuum, or Vacuum Insulated Panels with Polyurethane foam to fill the voids.

A thermocouple, inside the payload bay, measures the temperature at all times and sends a signal to the controller 6, where it is carefully monitored and the temperature is controlled. When the setpoint is reached, the controller 6 will stop the flow of liquid Nitrogen through the evaporator coils by turning the cryogenic solenoid valve 5 off. The cryogenic solenoid valve 5 controls the Nitrogen flow in a location that is considered unique by those familiar with the state of the art.

Typically, the control valve 5 is located in the coolant path between the source and the freezer 1. Said valve 5 is located at the exhaust port of the freezer, which provides equivalent control, but provides a substantially warmer environment for the valve, thus increasing the reliability and life of the valve.

The controller 6 monitors the payload bay temperature via a thermocouple and will use algorithms familiar to those skilled in the art of feedback control systems, such as PID control, to maintain the setpoint within a reasonable limit, such as +/−3 C in the preferred embodiment.

There are times when the pressure, normally at 100 psi, exceeds 150 psi. To prevent damage to the system, a pressure relief valve 27 is located in parallel with the valves 28 and 34. Normally a PRV vents to the room air and makes a loud hissing noise. However, in this embodiment, the PRV vents into the Nitrogen exhaust pipe 33, significantly reducing the sound.

A further advantage of the system is the capability of cooling the room where the freezer is located. All mechanical freezers accomplish cooling by transferring heat from the payload bay to the surrounding environment, thus heating the room. Typically, a room with several mechanical freezers requires a significant air conditioning system to make the room bearable for employees, and to prolong the life of other instruments and equipment in the room. However, in the preferred embodiment, the exhausting Nitrogen gas 31 is typically of a sufficiently cold temperature, approximately −100 C, that it is an excellent source for providing the equivalent of an air conditioner for the room. The Nitrogen gas flows from the freezer, through a heat exchanger 37 (similar to an air conditioner evaporator coil) located on the top of the freezer and through the control valves 28 and 34. Fans 36 force air 35 through said heat exchanger 37, where the air is cooled and delivered to the room. The fans 36 are controlled by the freezer electronics, with a thermocouple, also located on top of the freezer, as the feedback loop. Thus the operator can set the temperature on the display screen 6 and the room will be cooled to the said temperature within reasonable limits.

The Nitrogen exhaust gas 33 is then heated to a sufficient temperature to prevent condensation and icing of the vent pipes that leave the building and exhaust into the atmosphere.

Figure 6:
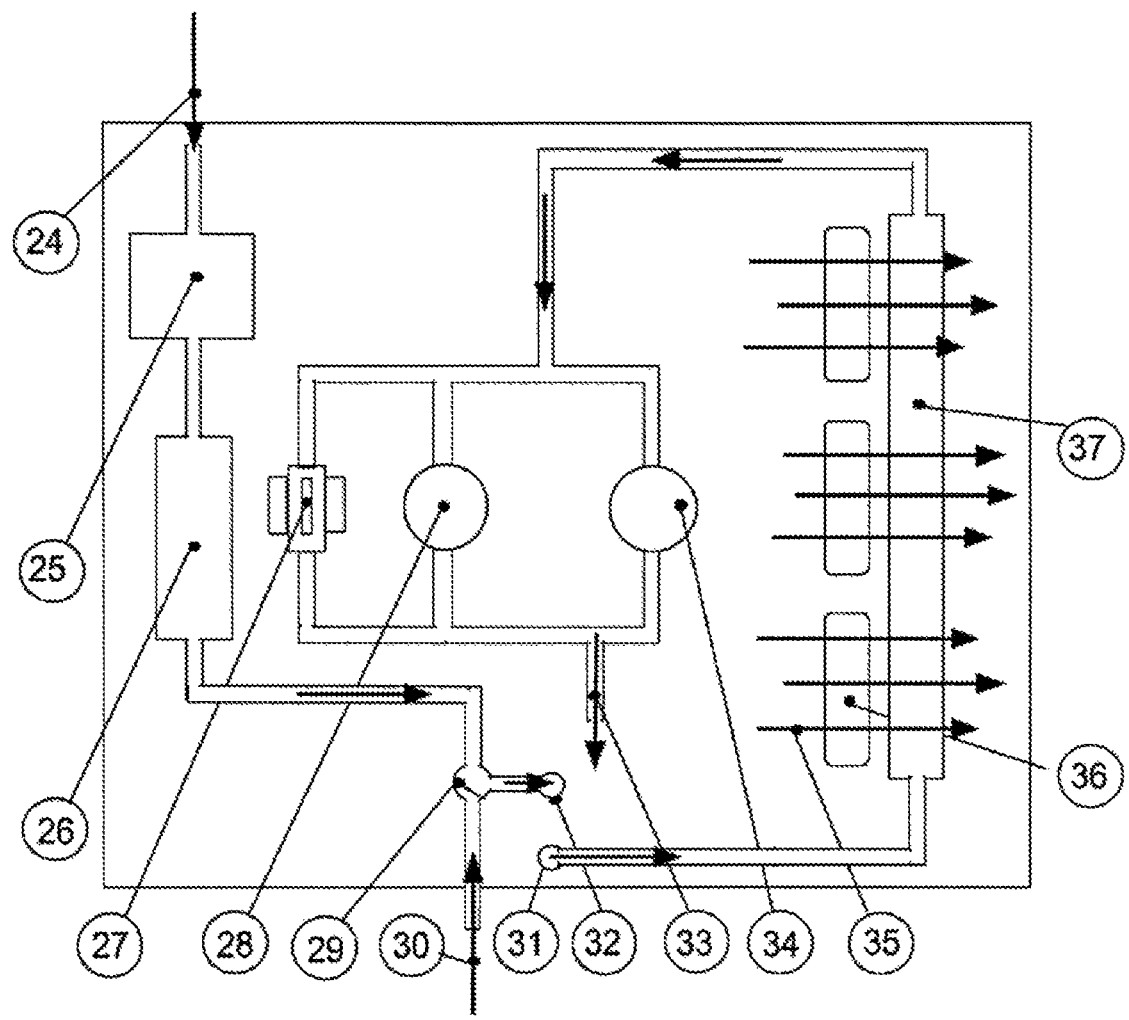
FIG. 6 is an exemplary top view showing the heating capability of product in the freezer, the heating capability for the Nitrogen exhaust gas, and the air conditioning capability of the freezer.

Another advantage of the Blast Freezer is the capability of heating the payload bay. Electrical heating pads, such as Silicone rubber heaters are located in the air flow path 9. When the customer sets the controller 6 to a temperature that is warmer than the current payload bay temperature, the heating pads are energized and continue to heat until the desired setpoint is reached. As shown in FIG. 6, as an alternative heating source, ambient room air 24 is injected into the system. A three-way valve 29 switches the Nitrogen gas 30 cooling to heated compressed air. Room air 24 is pressurized with an air compressor 25 and delivered to a holding tank 26. The air naturally becomes heated as it is compressed. The holding tank 26 may also be heated by external means such as natural gas, liquefied petroleum gas, electrical heaters, kerosene, propane, or butane. The flow of the compressed air through the freezer is monitored by the controller 6 and valves 28 and 34 that are normally used for freezing.

When the Blast Freezer is used for long term storage, a means is provided to efficiently maintain a fixed setpoint. It is known to those familiar in the art, that a high Nitrogen flow rate cools product extremely fast, and to maintain a fixed setpoint for several hours or days, a slower flow rate is more efficient. To accomplish this means, a second control valve 28 is installed parallel to the main control valve 34. When the customer sets the freezer for long term storage, the controller shuts the main control valve 34 off, shuts the internal fans 2 off and engages the slow flow control valve 28. The internal fans 2 are necessary for rapid product freezing, but not necessary when the product has already reached the setpoint temperature and the freezer is maintaining the setpoint.

A further advantage of the Blast Freezer is the improvement in efficiency of cooling compared to other Nitrogen freezers. Conventionally, the stainless steel walls 15 of the freezer body and door 16 are a conductive thermal path for environmental heat to pass through the exterior walls and into the payload bay 8. This problem is referred to as a "thermal short" by those skilled in the art of thermodynamics. The preferred embodiment, however, decreases the Nitrogen usage rate by as much as 30%. To eliminate this heat gain, a thermal barrier or disconnect decouples the sheet metal. The thermal barrier is a gap 17 in the sheet metal approximately ¼ inch wide in the preferred embodiment, eliminating the metal conductive thermal path. A non-metal material 18, such as a glass-based epoxy resin laminate, attached to both sides of the gap 17, provides structural support.

Typically, there is also significant heat gain through the gasket between the door and the freezer. As a means to reduce said heat gain, a rubber pneumatic seal 11 is placed between the door 16 and the payload bay 8. Said seal is inflated from the Nitrogen gas that is readily available at all times, since it is a byproduct of the cooling process. A further reduction in heat gain is accomplished with an additional impediment to the heat flow by adding a second door 19 interior to the main door 16.

A feature of the Blast Freezer is a means of operating the cooling system in event of power loss. Deep cycle batteries provide immediate backup energy. Further, in the event of prolonged power loss for several days, a mechanical valve located in parallel with the solenoid valve 5 provides a means for the operator to manually regulate the freezer temperature.

Safety valves 20 are used to prevent excessive pressures in the system. Said valves are generally used in the industry for this type of application. However, a common problem with the safety valve is that the extremely cold temperature of the liquid Nitrogen flowing through the valve can cause the valve to stick and remain open, when it should have closed. Further, this flow causes the valve temperature to plummet, which substantially increases the potential for a runaway condition, keeping the valve open continuously and needlessly, wasting large amounts of Nitrogen. This failure is known in the industry as "sticky valve".

To reduce this problem, heating fins 22 are added to the newly designed safety valve 21 in the preferred embodiment. These fins 22 keep the temperature of the valve warmer during pressure relief, thus significantly reducing the sticky valve problem. PRV 27 is an example of this preferred embodiment.

As a further means of improving reliability the preferred embodiment has no refrigeration compressor, common to most prior art freezers, thus alleviating wear problems associated with the multiplicity of moving parts.

In one embodiment, a Blast Freezer system includes a liquid Nitrogen inlet capable of convenient attachment to a customer's liquid Nitrogen supply and a cryogenic flow system that operates at significantly higher Nitrogen flow than conventional freezers. The system includes a payload bay with removable shelves, a plurality of evaporators inside the payload bay; and a plurality of fans that distribute the cooled air from the evaporators to the payload bay. A fan and an evaporator support structure have a multiplicity of holes that selectively direct the cooled airflow to provide even cooling throughout the payload bay. A thermal box is provided immediately outside the evaporators and payload bay that effectively thermally seals the payload bay from the outside environment, significantly reducing heat gain. The system includes a pneumatic latch that secures the freezer and a pneumatic rubber seal that provides an airtight seal for the payload bay. An electronic controller is provided that maintains a set point for the payload bay, determined by the operator between 20 C and −150 C. The electronics control payload bay temperatures consistently within +/−3 C of the set point throughout the shipment duration.

Figure 7:
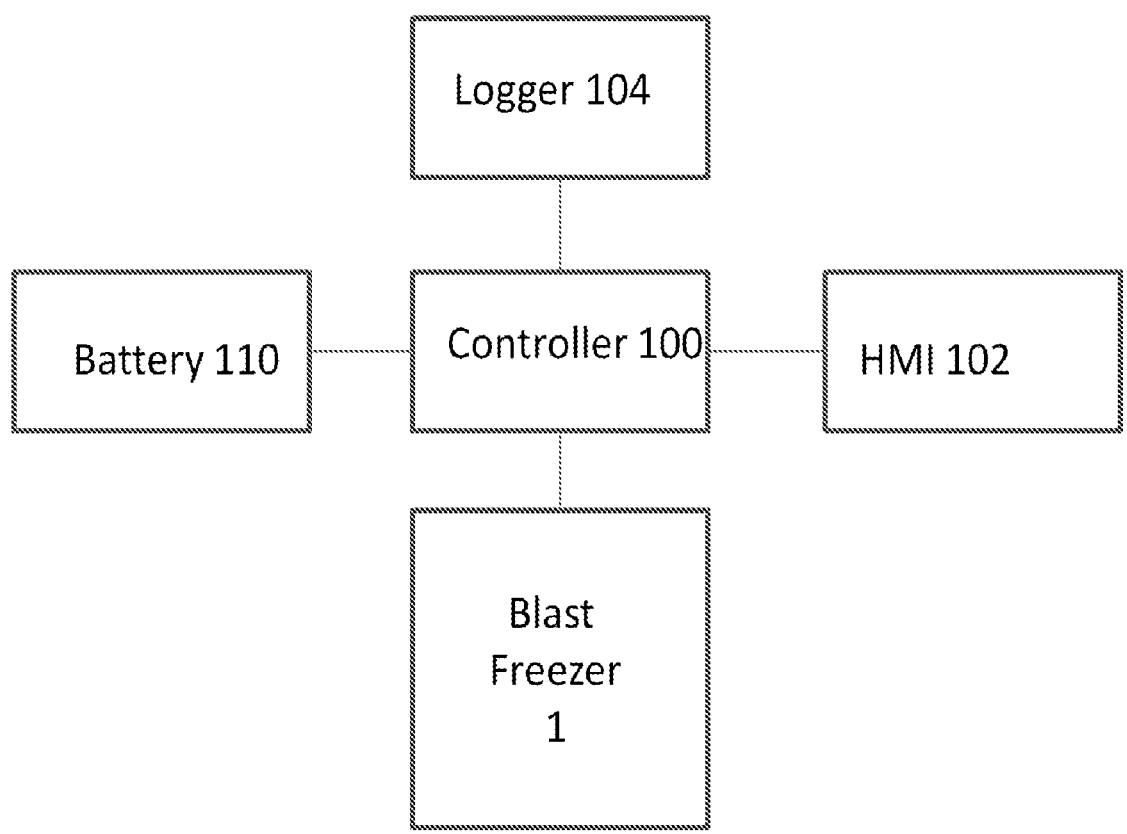
FIG. 7 shows an exemplary controller with battery backup system for the Blast Freezer.

FIG. 7 shows an exemplary Blast Freezer with a controller 100 and a battery back-up unit 110 for the freezer system 1. The control electronics includes an interactive Human Machine Interface or HMI 102. The HMI has a touch screen display. Said electronics also includes a data logging unit 104 with real time data, plotted on the display and recording temperature vs time. The electronics also includes the capability to transmit data logging information. The payload bay temperature control is provided by a cryogenic valve that is precisely controlled by the electronics. Further, said temperature control is achieved through the use of PID or another algorithm known to those skilled in the art. Deep cycle batteries in back up unit 110 can provide uninterrupted power in the event of AC power loss. Additional customer product thermal safety is provided by an emergency mechanical valve that regulates freezer temperature. A pneumatic latch and pneumatic rubber seal can be used and can be powered by the pressure derived from the Nitrogen exhaust gas. The safety valves have a mechanism to prevent a failure known in the industry as a "sticky valve", through the attachment of heat exchanger fins to the outside diameter of said safety valve. The assembly has a net thermal effect of reducing the temperature of the surrounding environment, rather than increasing the temperature, which occurs with prior art mechanical freezers. The cryogenic temperature control valve is placed in the exhaust path of the Nitrogen gas. Said location provides a warmer temperature location and promotes longer valve operating life than the standard location that is on the substantially colder incoming side of the freezer. The system is emission free and contains no polluting refrigerants such as CFCs or HCFCs. The entire cooling system is highly reliable due to almost no moving parts. The system has the capability of heating the payload bay. The entire Nitrogen flow is a closed system and the liquid Nitrogen and the Nitrogen gas never come in direct contact with the customer's product or the employees.

In one embodiment, a system includes:
a liquid Nitrogen inlet to attach to a liquid nitrogen supply;
a cryogenic flow system that operates at a predetermined nitrogen flow;
a payload bay with removable shelves;
a plurality of evaporators inside the payload bay;
a plurality of fans that distribute the cooled air from the evaporators to the payload bay;
a fan and evaporator support structure with a multiplicity of holes that selectively direct the cooled airflow to provide even cooling throughout the payload bay; and
a thermal box immediately outside the evaporators and payload bay, that effectively thermally seals the payload bay from the outside environment, significantly reducing heat gain, composed of high strength open cell panels and a vacuum or Vacuum Insulated Panels with Polyurethane foam to fill the voids.

Implementations can include one or more of the following:
an electronic controller that maintains a setpoint for the payload bay, determined by the operator between approximately 20 degree C. and −150 degree C.;
a second control valve that has a much lower flow than the first valve, providing more efficient cooling for long term storage,
a heat exchanger with several fans attached for warming the exhaust Nitrogen gas to prevent vent pipe icing, to improve control valve reliability, and to cool the room;
an air compressor, an air storage tank and means for heating the tank with a 3 way valve to select for cooling with Nitrogen gas or heating with warm air;
a pneumatic latch that secures the freezer;
a pneumatic rubber seal that provides an airtight seal for the payload bay;
electronics and mechanics that controls payload bay temperatures consistently within 3 degree C. of the setpoint throughout the shipment duration;
an interactive Human Machine Interface (HMI), and a data logging unit with real time data plotted on the HMI and recording temperature and time, and a wireless transceiver to communicate real time data over the Internet;
a measurement component coupled to the processor that measures a characteristic of service being provided to a specific customer in accordance with a service level agreement.

The freezer includes a plurality of evaporators coupled to a payload bay with a multiplicity of coolant tubes in each evaporator, wherein each tube enters and then exits the payload bay, further comprising one or more cryogenic valves coupled to the coolant tubes; a pump to force coolant flowing through the evaporators; sensors coupled to the evaporators of the freezer to monitor vital parameters of the freezer; a processor; a wireless telemetry system to communicate one or more measured characteristics of the freezer in accordance with a service level agreement to a remote computer; and at least one notification component that provides a notification associated with a specific customer responsive to the measured characteristic of the service crossing a pre-defined threshold.

Figure 8:
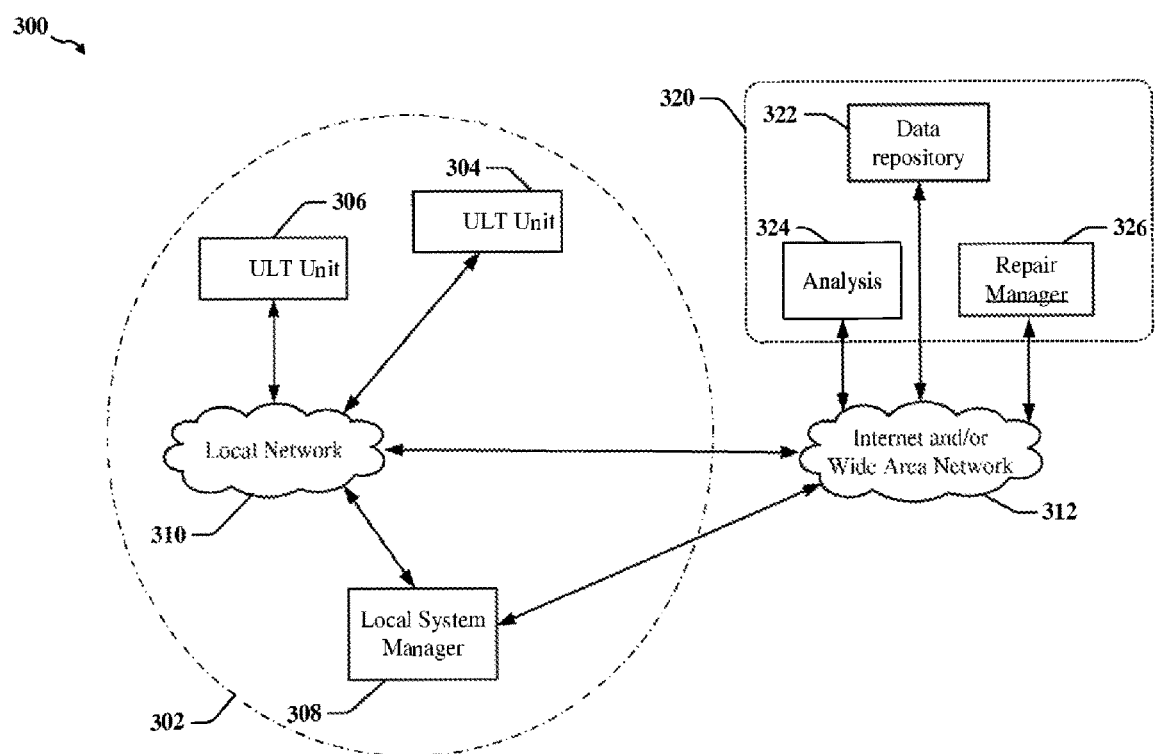
FIGS. 8-9 show exemplary remote management IOT systems for predictive management of one or more freezers.

FIG. 8 shows an exemplary schematic diagram 300 illustrating an example of a system configured to provide centralized or distributed control and/or monitoring of assets. ULT units 304, 306 may be deployed to communicate with, and/or control sensors that monitor certain aspects of a plurality of corresponding ULT systems. On a large campus, a sensor network 302 may be configured to more efficiently collect and distribute sensor data sampled by ULT units 304, 306 from sensors, and/or from other sources associated with ULT assets on the campus. The sensor network 302 may conform to a hierarchical architecture. In one example, a sensor network 302 may have one or more local system managers 308 that are deployed to collect and/or aggregate sensor data and other information provided by the ULT units 304, 306 through wireless transceivers. A local system manager 308 may manage and/or comprise a network of controllers and/or device managers. The Wireless transceivers in ULT units 304, 306 and the local system manager 308 may communicate through a local network 310, which may comprise a wired or wireless network.

The sensor network 302 may be coupled to a processing system 320 through a network 312 that may comprise a proprietary wide area network and/or a public wide area network such as the Internet. The processing system 320 may be centralized or distributed over a plurality of networked computing systems. The processing system 320 may provide a plurality of functional elements and devices, including a data repository 322, which may include a database system, an analysis system 324 that may be configured to process and analyze measurements, statistical data and trends, metadata and other information received from the sensor network 302. The analysis system 324 may employ historical data, profiles, design goals and other information maintained by the data repository 322 to review, process and otherwise analyze information received from the sensor network 302. The processing system 320 may include a repair management system that manages a repair process and service providers involved in the repair process using information received or retrieved from the sensor network 302, the analysis function 324 and/or the data repository 322.

In certain embodiments, Wireless transceivers 304, 306 and local system managers 308 of the sensor network 302 may communicate using connectionless communications systems. For example, one or more sensors may use a messaging service such as a Short Message System (SMS) cellular or a Multimedia Messaging Service (MMS). Other communications methods may be employed, including routable networks. In one example, communication within the sensor network 302 and between the sensor network 302 and public or private wide area networks may be based on protocols that establish a session used to exchange commands and data. In one example, communications may be facilitated through the use of protocols that establish a contiguous packet-based data connection utilizing a single routable protocol or other session comprised of non-contiguous data connections used to exchange commands and data.

The data captured by sensors and communicated over a wireless network to a central computer can be used for predictive management as well as for meeting a particular service level agreement (SLA), which is a contract between a service provider (either internal or external) and the end user that defines the level of service expected from the service provider. SLAs are output-based in that their purpose is specifically to define what the customer will receive. SLAs do not define how the service itself is provided or delivered. The metrics that define levels of service for a freezer SLA provider should aim to guarantee:

A description of the service being provided—maintenance of areas such as network connectivity, domain name servers, dynamic host configuration protocol servers Reliability—when the service is available (percentage uptime) and the limits outages can be expected to stay within Responsiveness—the punctuality of services to be performed in response to requests and scheduled service dates Procedure for reporting problems—who can be contacted, how problems will be reported, procedure for escalation, and what other steps are taken to resolve the problem efficiently Monitoring and reporting service level—who will monitor performance, what data will be collected and how often as well as how much access the customer is given to performance statistics Consequences for not meeting service obligations—may include credit or reimbursement to customers, or enabling the customer to terminate the relationship.

Escape clauses or constraints—circumstances under which the level of service promised does not apply. An example could be an exemption from meeting uptime requirements in circumstance that floods, fires or other hazardous situations damage the ISP's equipment.

Though the exact metrics for each SLA vary depending on the service provider, the areas covered are uniform: volume and quality of work (including precision and accuracy), speed, responsiveness, and efficiency. In covering these areas, the document aims to establish a mutual understanding of services, areas prioritized, responsibilities, guarantees, and warranties provided by the service provider.

The level of service definitions should be specific and measurable in each area. This allows the quality of service to be benchmarked and, if stipulated by the agreement, rewarded or penalized accordingly. An SLA will commonly use technical definitions that quantify the level of service such as mean time between failures (MTBF) or mean time to recovery, response, or resolution (MTTR), which specifies a "target" (average) or "minimum" value for service level performance.

With the sensors, the system's predictive maintenance leverages the Internet of Things (IoT) by continuously analyzing real-time equipment sensor data via machine monitoring to understand when maintenance will be required. Technician locations are coupled with replacement/repair equipment available and job completion time to identify the best technician available to perform the needed service during a scheduled downtime. The system leverages real-time condition monitoring and predictive maintenance to optimally maintain equipment. The system maintains the highest equipment availability while decreasing current costs:

Avoid costly corrective or preventative maintenance

Figure 9:
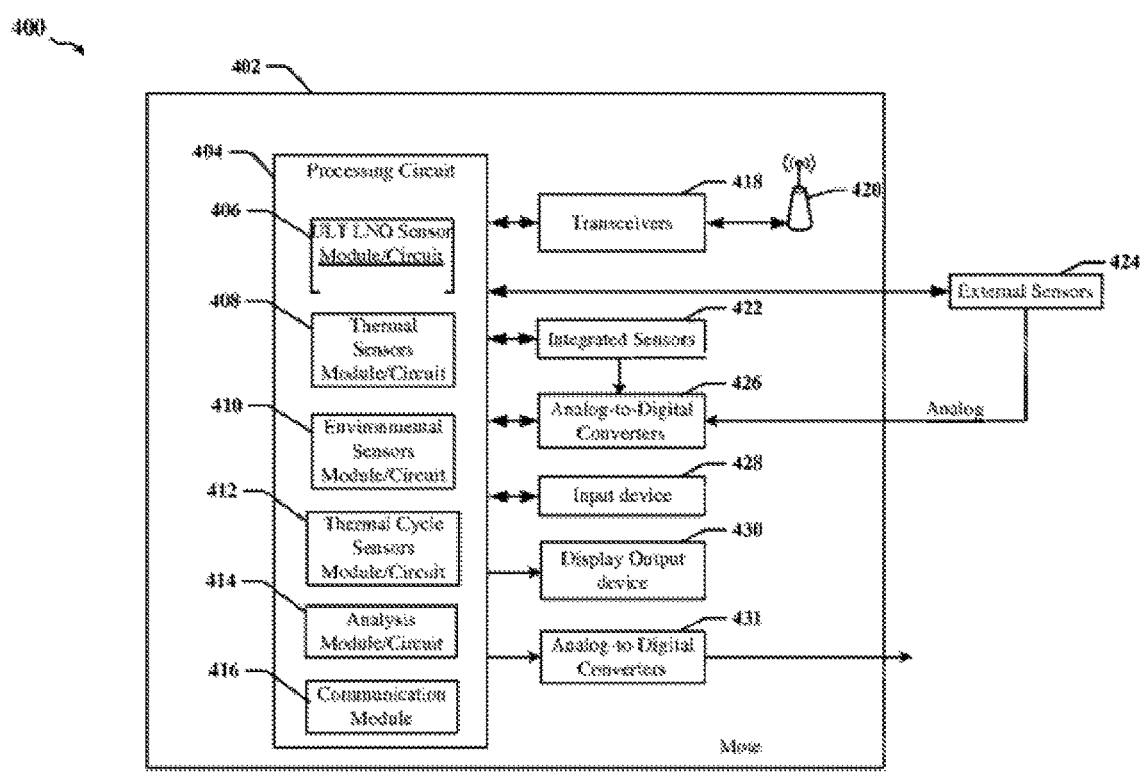

Ensure performance and availability utilizing real-time sensor data for condition monitoring and prediction Diminish technician overtime and "just in case" spare parts inventory levels FIG. 9 is a block diagram 400 illustrating an example of an architecture for a Wireless transceiver 402. The Wireless transceiver 402 may be configured to connect to a network 230 by any available means. In one example, the Wireless transceiver 402 includes a processing circuit 404 that may comprise one or more of a microprocessor, a microcontroller, a digital signal processor (DSP), sequencing logic, a state machine, etc. The Wireless transceiver 402 and/or processing circuit may also include a variety of commonly used devices and components such as non-transitory storage, light emitting diode (LED) lamps or indicators, buttons or switches and/or an audible alarm indicator. The Wireless transceiver 402 may include a communications transceiver 418 that includes radio frequency, optical or infrared transmitters and/or receivers. The Wireless transceiver 402 may communicate with one or more sensors 422, 424, including sensors 422 that are incorporated in or integrated with the Wireless transceiver 402 and/or external sensors 424 that may be coupled to the Wireless transceiver 402 using wired physical connectors and/or wireless communications. The Wireless transceiver 402 may additionally include a global positioning system receiver (not shown), a display controller 430, and user input controllers or drivers 428 that may interface with devices such as a keypad, touchscreen or the like.

The processing circuit 404 may include a ULT LNO sensor module/circuit 406 and one or more analog-to-digital (A/D) converters 426 configured to receive analog inputs from one or more of the sensors 422 and/or 424 for example, and one or more digital-to-analog (D/A) converters 431. The processing circuit 404 may include one or more sensors 422 and/or sensor control circuits. For example, certain sensors may be provided in an integrated circuit device, on a chip carrier or circuit board that carries the processing circuit 404. The may be configurable to connect to one or more external sensor devices 424. The sensors 422, 424 may include transducers that can be used to sense or measure door position, pressure, acceleration, temperature, humidity, magnetic field, light, load, inclination, radio frequency identification (RFID) signals and or RFID return signals, whether related to a passive or active RFID tag. The processing circuit 404 may include a battery or energy scavenging device and a wired, wireless, infrared, or magnetically coupled interface or transceiver 418 that is coupled to an antenna 420 used for communications. Faults detected are communicated with a repair manager 326 which communicates with the Internet/WAN 312.

Certain embodiments of the invention employ systems and methods that may select assets for repair and that may evaluate the subsequent repair process and the results of repairs. In one example, repairs may be evaluated with respect to changes in status, reliability or energy consumption. An analysis of performance data and metadata may be used to select assets in need of maintenance and/or repair. In some instances, the analysis of performance data may be used to suggest or select a repair process to address identified performance issues and other conditions. Information collected during the repair process may be captured and/or aggregated to assist in later analyses. Such information may be used to devise new repair strategies, policies and/or standard operating procedures.

In certain embodiments, a user may provide contextual information such as performance characteristics, design, type, make, model, manufacturer, configuration, repair history, configuration settings, environmental conditions, and other in-service information (which may be collectively referred to as metadata) to facilitate a better understanding of the many factors and variables that could affect performance of ULT systems and the effectiveness and long-term persistence of repairs and repair methodologies.

Certain embodiments may employ asset tagging features and methods to correlate information obtained from sensors and metadata with performance analysis and benchmarking information and/or information identifying whether repairs result in improved or achievement of expected levels of performance. Tags may be added, deleted or changed to characterize the state-of-health and status of repairs. In one example, a user and/or the system may increment or decrement the status or state of a repair to indicate a desired or deemed status of the asset so as to control the next response or action of a service provider. In this manner, the system can keep the service provider engaged and accountable until the repair is determined to have been effective and/or persistent over time, such that the ULT assets performs in accordance with desired or targeted performance levels and/or for a predetermined period of time after the repair.

To facilitate efficient repair and maintenance practices, the repair process may be managed and controlled in stages. Stages and gates may be defined to control progress between stages. For example, certain gates may control whether one or more further actions are allowed or not allowed depending on successful completion of previous states, events or outcomes.

In certain embodiments, systems and methods are provided that report changes or improvements, or lack thereof, in measured or observed performance before, during or after service, maintenance or repairs. Computing devices may be configured to determine if applied maintenance results in improved or expected levels of performance. Computing devices may be configured to determine whether improvements following repair are persistent, such that improved or desired performance continues at various points and times after time of service.

In certain embodiments, systems can be packaged for wireless transceiver deployment by a field service technician for example. Sensor generated information and metadata may be processed at deployed systems in real-time and the results may be stored locally and downloaded for evaluation at a later time, or transmitted periodically through a network for evaluation at a central location. In this manner, results gathered and processed at wireless transceiver deployed devices may be aggregated, analyzed and/or reviewed centrally using more powerful analytical tools and drawing on centralized human and machine expertise as required. In some instances, information aggregated from disparate sources and/or multiple operators (federated data) may be used by the analytical tools.

In certain embodiments, information and metadata may be acquired indirectly and included in processing and decision-making. For example, technicians, operators and other persons performing various operations, including examination, maintenance and/or repair operations related to a ULT system may obtain information relevant to the operations and/or status of the ULT system, and such persons may enter such information for evaluation. In this manner, results and other information gathered and processed at wireless transceiver deployed devices may be aggregated, analyzed and/or reviewed centrally regardless of whether such information is obtained automatically from sensors and other equipment, or by human intervention or observation. Data that is entered manually may include equipment location and historical repair information or qualitative or quantitative data related to configuration, environmental or operating conditions such as room temperature voltage levels measured at one or more points in an electrical circuit, repair information such as observed condition of filter media, air-flow restrictions, repair type codes and cost of repairs for one or more codes. According to certain aspects described herein, raw data can be imported from another system and included in analysis.

Certain aspects of the present invention relate to systems, apparatus and methods for identifying and/or selecting ULT assets in need of repair and/or managing a repair process for the selected or identified ULT assets. ULT assets, performance levels of the ULT assets, defects, imperfections and repairs initiated for the ULT assets may be classified in accordance with certain aspects disclosed herein. In one example, ULT assets may be classified according to configuration, in situ environment, reliability, performance, make, model, and manufacturer. The repair process may be optimized and the effectiveness and persistence of repairs over time may be determined in accordance with certain aspects disclosed herein. In one example, the effectiveness of repairs may be classified in relation to a service provider, which may include a commercial enterprise, internal service organization and/or an individual selected to perform repairs.

A field service technician may be provided with instructions identifying or suggesting services and repairs that may be performed. Notifications may be generated or received indicating whether the repairs prove to be effective and persistent over time. In one example, notifications may be received from the sensor network 302 and/or from service providers responsible for repairs. In an initial state 602, repairs are considered to be in a pending state. While in the pending state, a service technician may be dispatched. The service technician may be provided with information identifying a ULT system 202 to be repaired, one or more symptoms and a repair protocol explicitly identifying or suggesting repairs to be made during a service call. The service technician may execute the repair protocol or, in some instances, may replace a failing ULT system 202, and the process moves to a repaired state 604. In the repaired state 604, the target ULT system 202 may be tested and/or monitored to determine if the repair was effective. In one example, testing and monitoring may include an analysis of sensor data provided by one or more Wireless transceivers 218, 226.

If the repair is deemed ineffective, then at state 608, further repair and/or monitoring may be conducted to determine if the effective state 606 can be achieved by means of additional repairs or reconfiguration. If the ineffective state 608 cannot be corrected, then the repair process may be cancelled and the repair activity enters a closed state 614. If the repair has been deemed or determined to be effective, then in the Effective state 606, the operation and performance of the ULT system may be monitored for one or more periods of time to determine if the repairs are persistent over time. In one example, monitoring may include an analysis of sensor data provided by one or more Wireless transceivers 218, 226. The one or more periods of time may be contiguous periods of time, or may be spaced over a more prolonged monitoring period. In some instances, no further monitoring is needed and the repair process may enter a closed state 614 from the effective state 606. The period of time during which repair monitoring is performed at the Effective state 606 may be identified in a repair protocol and, when the effects of the repair persist, the process may move to a Persistent state 610 from which the process may be manually or automatically transitioned to a closed state 614. If, however, the repairs are determined to be non-persistent, the process may move to a "Not Persistent" state 612 from which the process may be manually or automatically transitioned to a closed state 614.

In certain embodiments, system-generated reports can provide documentation that enable utility companies and municipalities and/or state entities to provide energy rebates and incentives. The reports may determine an amount of incentive or rebate due by calculating deemed energy savings or net energy savings by adding or subtracting all energy gains and losses over a defined time period for each asset, then all monitored assets in total, thence applying a rate or factor representing the amount of incentive or rebate due for each unit of energy saved or lost over a prescribed period.

In certain embodiments, a service provider may issue an invoice for a repair, which may include a code issued by the system to confirm that a repair activity meets predefined thresholds and standards for post-repair performance and effectiveness. The code may be interpreted by a customer of the service provider responsible for repairs as confirmation that the performance and/or deemed effectiveness or deemed persistence standards have been met by the repair or that maintenance has achieved desired levels of performance optimization.

Data Flow in a Repair Process is discussed next. Certain embodiments of the invention for measuring the state-of-health of a ULT asset employ or are based on certain systems and methods for monitoring, inferring state of health, and optimizing efficiency of ULT systems. According to one or more aspects disclosed herein, ULT systems may be monitored using wired or wireless sensors (see the Wireless transceiver 402 of FIG. 12, for example), which transmit data to a processing system 320 (see FIG. 11) for analysis and benchmarking related to performance. Performance data for a target ULT system may be processed, analyzed, indexed and/or plotted in reference to time, benchmarks and/or predetermined or predefined norms, in order to determine relative performance of the target ULT system in relation to one or more peer systems. The peer systems may be defined based on the classification of the target ULT system based on characteristics and attributes such as reliability, configuration, in situ environment, performance, make, model, manufacturer, application and/or an operational history of the target ULT system. The analysis of performance data may employ one or more mathematical or pattern recognition functions, such as a sine wave or a statistical model.

According to certain aspects, contextual information may be obtained from a user or by querying a database or other repository of information. In one example, the user may provide access to contextual information such as such as design, make, model, configuration, repair history, configuration settings, environmental conditions, and other in-service information ("Meta Data") that may facilitate an understanding of the various factors and variables that may affect, measure or qualify performance of a ULT system and/or the effectiveness and persistence of a repair process and corresponding repairs.

Certain analytics methods may be applied to discover meaningful patterns and behaviors from the sensor data. A statistical analysis may be used to examine features as a sample from one or more like sensors to find population norms. Benchmarking may be employed to compare the features and/or characteristics of multiple sensors to determine the distribution of values within a population, and to use the corresponding percentile to score the feature of that asset. A time-series analysis may be applied to identify features for a single sensor over time, and/or to determine trends or changes, which may indicate the onset of failure. Asset classification may be used to classify or tag assets based on computed values, changes over time, etc. Asset classification may consider all data to determine if an asset should be tagged for repair, for example. Asset tags can be added or removed based on trends.

Other data may be considered in addition to the sensor data. In one example, a fusion of sensor data and disparate data elements may be employed to learn new things. For example, one or more sensors may be employed to monitor plug load energy consumption in a defined area such as in a room. Plug load energy is consequently an object that can be benchmarked in a manner similar to other objects such as compressors used in a ULT system. Such sensor data may be fused with other data to detect human activity and energy intensity in the area. In one example, the placement of additional equipment in the room may indicate a new use pattern for the area, or more or less water or lighting being used than before or in comparison to other objects. These new data from external sources may be mined to derive a better understanding of energy utilization relative to other monitored objects deemed to be similar or comparable.

One or more maintenance states may be communicated using a grading system that can be expressed graphically and/or textually. For example, a color-coding scheme may be applied to a graphical display indicating current performance metrics, such as power consumption, cycle variance, temperature curves, and the like. An asset may be graded using a configurable and/or familiar color-coding system (Green, Yellow and Red), such that the performance of each asset can be determined in comparison to known achievable levels of performance and energy efficiency to its peers (same make/model) in the population. Grading scores may be derived from sensor data obtained from sensors associated with assets deployed in a variety of settings, locations, and configurations.

In one example, assets performing within expectations may be color-coded as Green assets, while underperforming may be coded as Yellow or Red assets. A higher grade (Green) may indicate that the asset is deemed to be operating efficiently, and/or may be consuming less energy than the average of its peers. A next grade (Yellow) may indicate that the scored asset is exhibiting signs of stress and is consuming more energy than the average of its peers. Although there is some potential for energy savings, payback for repairs on these assets may not be as attractive, although repairs and mitigation measures on these assets may achieve higher levels of reliability as an operational policy decision. A low grade (Red) indicates serious maintenance, configuration, environmental, and/or other problems. Assets scored "Red" may be immediate candidates for repair as they are exhibiting signs of stress consistent with imminent mechanical failure, in addition to wasting significant amounts of energy.

Scoring may be accomplished when enough data for a specific asset make/model group is available. A color-code score may be assigned to each asset based on its current performance, before repairs, and/or relative to its peers in a database of the same or similar make/model assets. Asset grades may be assigned based on statistical analysis that may identify an Optimal Level of Performance (OLP) based on a predefined standard deviation. In one example, the top 10% statistically and best performing assets for the make/model may be deemed to have achieved the OLP, and no repairs need be performed on these assets and in many cases maintenance can be deferred for this assets. An asset that is assigned a grade of Yellow may exhibit a calculated annual energy consumption that is 76% to 89% of the OLP. These assets are candidates for repair. An asset may be assigned a grade of Red if the projected annualized kWh is less than 75% of the OLP. Such assets may be identified as candidates for immediate repair.

In one example, a proxy profile may be used to temporarily assign a make/model profile to an asset. An administrator may select a proxy, which represents a similar asset in terms of size, age and construction. Once it has been determined that the database contains a sufficiently large sample for the target make/model, then the proxy or the make/model group may be removed and the system may score the assets using the automated scoring methodology described above using empirical data.

In another example, estimated asset scoring may be employed when there is insufficient make/model data in the database to score an asset. An estimated grade may be assigned based on an analysis of compressor cycling or other known measure of mechanical stress that is highly correlated with energy consumption. An asset may be assigned a grade of Green if the compressor on-time is below 74%. No repairs need be performed on these assets. An asset may be assigned a grade of Yellow if the compressor on-time is 75%-84%. These assets are candidates for repair. An asset may be assigned a grade of Red if the compressor on-time is above 85%. These assets may be candidates for immediate repair.

A benchmark scoring process may be run automatically once per month and prior history is retained by the system such that asset grade changes, attributable to changes in asset performance, can be tracked over time for each individual asset.

One exemplary repair management process begins when a current (or "pre-repair") baseline may be obtained from measurements taken for a targeted ULT system, prior to the start of the repair. The current baseline and/or one or more other baselines may be created for any attributes that can be measured or calculated for the ULT system, including in reference to its peers. In some instances, the baseline may relate to averages of measurements and calculations obtained from a group of peer ULT systems or ULT assets. In some instances, the baseline may relate to measurements and calculations obtained from a specific set of ULT assets classified according to performance within a particular environment or context. For example, the performance of a specific set of ULT assets may correspond to hot room, cold room, low airflow, and/or low voltage configurations.

Next, the system determines that a repair is to be performed for a ULT system. The determination may be based on the evaluation of one or more baselines for one or more attributes of the ULT system. The baselines may be used as known achievable goals to guide and/or control the repair process. A normal baseline may be identified, where the normal baseline identifies expected values for a given attribute or operating characteristic of the ULT system to be repaired, or for an idealized or optimally operating ULT system of a comparable or same type. In one example a baseline may be determined from manufacturer-provided information. In another example, the baseline may be a manufacturer-provided or user-specified baseline based on experience with comparable equipment, or an empirical baseline obtained from observed performance of the ULT system targeted for repair, or from observed performances of a peer group of ULT systems.

In some instances, recommendations of a make and/or model of ULT asset may be made for use in a specific context where the recommended ULT asset may not score well in other contexts and/or may exhibit lower performance levels when measured on average against its peers. In one example, a ULT asset may be recommended when high door access activity is anticipated when the recommended ULT asset exhibits superior recovery efficiency. In another example, a ULT asset may be recommended for usage in a low-voltage environment. In another example, a ULT asset may be recommended for usage in a room that has poor airflow. In these examples, recommendations may be made using alternative scores that are generated based on different conditions of installation or use.

Next, the repair is initiated. A repair technician may begin by assessing the equipment health and assigning problem codes and one or more repair codes associated with the target ULT system. These problem codes and repair codes may be used to determine expected post-repair performance levels and/or performance level improvements for the target ULT system, which may be expressed in one or more post-repair baselines. Each of the post-repair baselines may relate or correspond to one or more measurable or calculable attributes. After the repair is physically completed, the repaired ULT system may be allowed to stabilize prior to capturing one or more post-repair baselines from measured attributes and performance parameters of the repaired ULT system.

Next, the one or more post-repair baselines may be used to determine if the repair was effective. The determination may be based on one or more of the measured attributes. In some instances, measurements of all of the attributes in the one or more post-repair baselines may not be available immediately after repair, and the assessment of the effectiveness of the repair may be a partial assessment and/or provisional in nature. One or more algorithms may be applied to compare one or more post-repair baselines with corresponding pre-repair baselines and/or normal baselines to determine if the repair was effective. If the repair is deemed not effective at block 1008, then a notation to that effect may be made and a repair may be attempted again.

If the repair is determined to be at least provisionally effective, then at block 1010 a notation to that effect may be recorded in a log, journal or other information characterizing the repaired ULT system. A provisional determination of effectiveness may be confirmed or retracted after new measurements are obtained after the ULT system has fully stabilized. The expected post-repair baselines may identify the duration of the settling period of time. This decision of effectiveness may be based on repair codes and on the peer group that is being used for comparison.

In the event that an effective repair is determined, the repaired ULT system may be monitored for a period of time after the repair is deemed effective to determine whether the repair is persistent. In some instances, the latter determination may be used to determine if a utility incentive payment may be applicable. For example, the period of time may be selected based on a deemed measure defined by an energy provider who offers energy incentives and rebates for energy efficiency measures. A persistent repair may be a repair that returns the repaired ULT system to normal operation for a prolonged period of time. Normal operation may be defined by the system, an operator, an energy producer, or the like. The prolonged period of time may be determined when the repair is initiated. Various criteria may be applied to define the point at which the repair may be determined to be persistent over time. In some embodiments, a counter, timer and/or other metering device may be employed to measure elapsed time from repair until the point at which the repair can be determined to be persistent. In one example, a timer may be initiated to define a time-based monitoring period during which total energy consumption must remain below a predetermined threshold. In another example, a cycle counter may be configured to define a range or total number of cycles or amount of compressor active/on-time to be achieved or maintained in order to determine persistence of repair.

The timer, counter and/or other meter may be monitored to determine when the repair can be deemed effective. If the monitoring period has not expired, the performance of the repaired ULT system may be continually or continuously assessed during the monitoring period and post-repair baselines may be updated or augmented with measurements obtained during the monitoring period. Accordingly, additional determinations of effectiveness of the repair may be made during the monitoring period. In one example, the additional determinations of effectiveness may continue until the repair is determined either ineffective or effective and persistent, after expiration of the monitoring period. Problem and repair codes may be analyzed, correlated and associated with the specific make/model or design of the ULT system to programmatically ascribe, for future reference, recurring problems and repair codes for specific make/models or designs.

In some instances, measurements captured at a plurality of ULT assets by one or more smart sensors, Wireless transceivers, or smart modules may be configured to communicate the measurements through a datalogger. The data logger may be implemented using circuits or modules of the smart sensors, Wireless transceivers, or smart modules. The datalogger may store or otherwise maintain sensor data and other information that can be communicated through a network after the datalogger has identified or established a network connection. In certain examples, information collected from smart sensors, Wireless transceivers, or smart modules may be transmitted to an analysis system through a network at a predefined rate (e.g. every 4 or 8 minutes) as a bundle of observations made a faster rate (e.g., every 30 second or every minute), and/or at the earlier of a longer-term timer (1 hour) or alarm. In some examples, the datalogger, smart sensors, Wireless transceivers, or smart modules may be adapted to execute one or more data processing algorithms using the sensor data. In some examples, the datalogger, smart sensors, Wireless transceivers, or smart modules may be adapted to manage certain aspects of a repair process, including enabling a wireless transceiver supervisor to oversee the work of less qualified service personnel.

According to certain aspects, multiple evaluation periods may be defined in order to determine whether a repair is persistent. These evaluation periods may be contiguous and the performance of a repaired ULT asset may be evaluated independently during each evaluation period. In some instances, one or more evaluation periods may overlap. For example, first and second evaluation periods may both commence immediately after repair of the ULT asset. The second evaluation period may span a longer interval of time than the first evaluation period.

Configurable parameters may be used to determine the duration of the monitoring period used to evaluate the persistence of a repair. Persistence may be measured over time and one or more parameters may dynamically adjust the persistent threshold to account for normal mechanical degradation and/or changes in configuration or environment. In some instances, one or more additional "persistence" baselines may be established for one or more attributes. The persistence baseline may be compared with the post-repair, pre-repair and/or normal baselines to determine if the repair persisted over the specified monitoring period. If the repair persisted, the repair process may be deemed complete. If the repair is not effective or does not persist, a decision to attempt another repair of the ULT may be made. The decision may rest upon differences observed in the various baselines related to previous repairs, improvements or degradations in performance and any new information obtained during previous repairs to the same, similar or comparable systems. Persistence of a repair may be based on a comparison mechanical or energy performance to a set point, benchmark, rule, method or standard.

Certain calculations using the baselines derived from or established for peer groups and the post-repair baselines may enable the system to flag the repairs as either effective or persistent based on the time frame during which the calculations are performed. The peer group may establish and/or define acceptable values for various attributes to be monitored. The peer group may account for in-situ variables to enable the evaluations to calibrate for the actual ULT system that is being repaired. The in-situ variables may include operational parameters such as set point, airflow, supplied power, power quality levels, and ambient temperature. Leveraging pre-repair snapshots may enable an accurate evaluation of the effectiveness and persistence of repairs.

In some instances, a ULT system may be selected for repair based on an analysis of performance data and/or in comparison to Meta Data. Meta Data may include repair codes and repair costs, for example. The selection process, pre-repair, post-repair, persistence and other baselines may be used to modify repair processes and/or to devise new repair strategies, improved repair strategies, policies or standard operating procedures.

Asset tagging features and methods may be employed to facilitate management of the repair process. Asset tagging features may be used to correlate sensor measurements, Meta Data and measured, estimated or calculated performance of ULT systems. Asset tags may be added, deleted and/or changed in a manner that characterizes the state-of-health of a ULT system and status of repairs associated with the ULT system. In one example, asset tagging may include a status indicator that can be incremented, decremented, or otherwise modified to indicate progress, status, state of a repair and/or or changes in performance. The asset tag may be used to control a service provider's next action or response. In this manner, the service provider may remain engaged and accountable until the repair is deemed effective and/or persistent, as determined by desired or targeted levels.

To facilitate efficient repair and maintenance practices, the repair process may be managed and controlled in stages, with gates that allow or disallow further actions. The gates may be operated based on successful completion of previous states, events or outcomes. Progress may be measured based on the current stage of the repair process. In one example, payment of a service provider invoice may be conditioned on the inclusion in the Invoice of a system-issued code indicating the effectiveness or persistence of the repair In some instances, changes or improvements in performance of a ULT system, or lack thereof, may be reported before, during or after service, maintenance or repairs. Effectiveness of a repair or maintenance may be automatically determined based on whether improved or expected levels of performance are measured after the repair and/or maintenance. Information identifying the status, effectiveness and/or persistence of repairs and/or maintenance may be provided on a dynamic display of system status. For example, performance of a population of ULT systems may be tagged with a qualitative color code, highlights or other means to identify failing, underperforming, and repaired ULT systems. The status of ongoing repairs may be highlighted until the repair is deemed persistent. Historical information, including status performance levels and repair codes may be provided in an alert, alarm and/or scheduled or ad-hoc report.

Various aspects disclosed herein may be implemented in a distributed computing system. In one example, a field service technician may be equipped with a portable computing system that can communicate with a local or wireless transceiver application server. The portable computing system may maintain copies of information related to systems to be repaired. In one example, the portable computing system may maintain or have access to various baselines associated with an underperforming or defective ULT system. The portable computing system may maintain information including sensor measurements and Meta Data that can be processed in real-time. The results of such processing may be provided to a networked resource that is configured or adapted to perform detailed analysis of the information and provided profiles and baselines to be evaluated by more skilled individuals or decision support systems. The portable computing system may provide the repair technician with real-time results of the repair and feedback from network resources. The portable computing system may provide a field service technician with instructions regarding services and repairs to be performed. In some instances, the portable computing system may notify the field service technician when repairs are deemed effective and/or persistent. In some instances, the portable computing system may provide instructions or suggestions from another skilled or specially trained person or manager.

In some embodiments, information may be generated that document energy efficiency and savings. Such information may be used to determine appropriate or contracted utility energy rebates and incentives. For example, reports may be generated that determine the amount of incentive or rebate due by calculating energy savings or net energy savings by adding, and/or by subtracting all energy gains and losses over a defined time period for each asset. The calculations related to an incentive or rebate may be based on rules and methods set by an energy provider. A total energy savings or efficiency for all monitored assets may then be used to calculate rebates and incentives by applying a rate or factor representing the amount of incentive or rebate due for each unit of energy saved or lost over a prescribed period. In some instances, energy savings may be projected over a long period of time to determine the incentive payment due from a utility for the specified period of time, based on projected performance which may include adjustments to account from normal mechanical degradation and other factors likely to occur during such period.

In some instances, the status information regarding a repair or maintenance event may be used to generate and invoices. In one example, an invoice issued by a service provider may include a system-generated code that confirms the performance levels of a repaired ULT system, effectiveness and/or persistence of a repair. The code may be interpreted by a customer as confirmation that the repair or maintenance has achieved a desired level or result. The desired level or result may be based on the achievement and/or persistence of improved levels of health, reliability, and energy efficiency or that it may have done so for a period of time.

In another method for managing and controlling a network of ULT system, measurements captured at a plurality of ULT systems are received. The measurements may include measurements of temperatures and energy consumption and compressor performance that characterize the performance of each of the plurality of ULT systems. The measurements may be captured at the plurality of ULT systems by a plurality of smart sensors configured to communicate the measurements through a network, or may be manually entered or programmatically uploaded into the system by other means. At least one of the plurality of smart sensors may be configured to communicate statistical information based on measurements of performance of a ULT system associated with the at least one smart sensor. At least one of the plurality of smart sensors may be configured to communicate analytical information based on a statistical analysis of measurements of performance of a ULT system associated with the at least one smart sensor.

Next at least one ULT system that is performing below an optimal level may be identified or determined. The optimal level is determined based on a comparison of the performance of a reference population of ULT systems identified in a history of prior measurements. Next, a repair process for the at least one ULT system may be initiated. At least one ULT system may be monitored for a predefined period of time to determine whether the at least one ULT system is performing at the optimal level or above for a predefined period of time after the at least one ULT system has been repaired.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A freezer, comprising:
cryogenic evaporators coupled to a payload bay with one or more cryogenic valves coupled to the coolant tubes, wherein one of the one or more cryogenic valves is located at an exhaust port of the freezer;
a rubber pneumatic seal is placed between a freezer door and the payload bay;
a pneumatic latch for latching the freezer door;
wherein the rubber pneumatic seal and the pneumatic latch are powered by pressure derived from an exhaust gas;
a pump to force a coolant flowing through the cryogenic evaporators with a pressure of at least 90 psi to supply the coolant at each of the cryogenic evaporator with at least 20 gallons per hour of coolant flow rate;

a plurality of fans to circulate cooled air in the payload bay;
sensors coupled to the cryogenic evaporators of the freezer to monitor parameters of the freezer;
a processor;
a wireless transceiver to communicate one or more measured characteristics of the freezer in accordance with a service level agreement (SLA) including mean time between failures (MTBF) to a remote computer; and
wherein the processor provides a notification associated with a specific customer responsive to the measured characteristic of the service crossing a predefined threshold.

2. The device of claim 1, wherein the service is a temperature service.

3. The device of claim 1, wherein the processor with maintenance prediction code predicts when maintenance is needed.

4. The device of claim 1, wherein the processor sends a message addressed to the specific customer to notify the specific customer about the measured characteristic crossing the pre-defined threshold.

5. The device of claim 1, wherein the processor sends a notification message addressed to a service to notify a service provider about the measured characteristic crossing the pre-defined threshold.

6. The device of claim 5 wherein at least one of a trouble ticket and a billing credit associated with the specific customer is generated in response to the notification message.

7. The device of claim 1, wherein the processor sends a message addressed to a monitoring entity that is independent of a service provider providing the service.

8. The device of claim 1, wherein the characteristic measured includes temperature and humidity level, and the pre-defined threshold is a minimum level necessary for delivery of the temperature service.

9. The device of claim 1, wherein the processor determines ultra low temperature (ULT) performance.

10. The device of claim 1, wherein measurements are captured by a plurality of sensors.

11. The device of claim 10, wherein at least one of the sensors is configured to communicate statistical information based on measurements of performance or energy consumption of the freezer.

12. The device of claim 10, wherein at least one of the sensors is configured to communicate analytical information based on a statistical analysis of measurements of performance of the freezer.

13. A method to provide ultra low temperature processing for a freezer comprising:
providing one or more cryogenic valves coupled to the coolant tubes, wherein one of the one or more cryogenic valves is located at an exhaust port of the freezer;
providing a rubber pneumatic seal placed between a freezer door and a payload bay;
providing a pneumatic latch for latching a freezer door;
wherein the rubber pneumatic seal and the pneumatic latch are powered by pressure derived from an exhaust gas;
providing a pump to force a coolant flowing through the evaporators with a pressure of at least 90 psi to supply the coolant at the evaporators with at least 20 gallons per hour of coolant flow rate;
providing a plurality of fans to circulate cooled air in the payload bay;
cryogenically cooling one or more compartments contained in a payload bay with cryogen fluid;
measuring a characteristic of service being provided to a specific customer; and
generating a notification associated with the specific customer responsive to the measured characteristic of the service crossing a pre-defined threshold.

14. The method of claim 13, comprising sending a message addressed to the specific customer to notify the specific customer about the measured characteristic crossing the pre-defined threshold.

15. The method of claim 13, comprising sending a notification message addressed to a service to notify a service provider about the measured characteristic crossing the pre-defined threshold.

16. The device of claim 15 wherein at least one of a trouble ticket and a billing credit associated with the specific customer is generated in response to the notification message.

17. The method of claim 13, comprising sending a message addressed to a monitoring entity that is independent of a service provider providing the service.

18. The method of claim 13, comprising predicting when freezer maintenance is needed based on a mean time between failures (MTBF).

* * * * *